United States Patent [19]

Kojima et al.

[11] Patent Number: 4,737,548
[45] Date of Patent: Apr. 12, 1988

[54] ADHESIVE RESINS AND LAMINATE ARTICLES

[75] Inventors: Shinji Kojima, Yokohama; Hirokazu Suzuki, Kawasaki; Yuichi Orikasa, Tokyo, all of Japan

[73] Assignee: Nippon Petrochemicals, Tokyo, Japan

[21] Appl. No.: 926,564

[22] Filed: Oct. 31, 1986

Related U.S. Application Data

[62] Division of Ser. No. 754,522, Jul. 12, 1985, Pat. No. 4,654,255.

[51] Int. Cl.$^4$ .................................................. C08F 8/00
[52] U.S. Cl. ........................................ 525/193; 525/71; 525/285; 428/461; 428/483; 428/516; 428/520
[58] Field of Search ............... 525/285, 286, 386, 387, 525/327.3, 71, 193

[56] References Cited

U.S. PATENT DOCUMENTS 3,875,255  4/1975  Kato et al. ..................... 525/285 X

FOREIGN PATENT DOCUMENTS 0673081  11/1965  Belgium .
2275522  1/1976  France .
0923095  4/1963  United Kingdom .

OTHER PUBLICATIONS

European Search Report App. 85108842.

Primary Examiner—Theodore E. Pertilla
Attorney, Agent, or Firm—Ladas & Parry

[57] ABSTRACT

Adhesive resins obtaned by reacting 100 parts by weight of an epoxy group-containing olefin polymer with 0.01–10 parts by weight of at least one ethylenically unsaturated fatty acid or derivative thereof, are described. The adhesive resins or olefin polymer compositions comprising the adhesive resins are particularly useful in lamination with other types of resins. Such laminates are also described.

4 Claims, No Drawings

ADHESIVE RESINS AND LAMINATE ARTICLES

This is a divisional of co-pending application Ser. No. 754,522 filed on July 12, 1985, U.S. Pat. No. 4,654,255 issued 3/31/87.

BACKGROUND OF THE INVENTION

1. Field of the Invention

This invention relates to adhesive resins which have good adhesion to various other materials such as polyolefins, polyamides, polyesters, saponified ethylenevinyl acetate copolymers and metals, and also to laminates using the same. More particularly, the invention relates to adhesive resins which are obtained by chemically combining 0.01–10 parts by weight of ethylenically unsaturated fatty acids or derivatives thereof with 100 parts by weight of epoxy group-containing olefin polymers, and to laminates using such adhesive resins. The laminates are useful as food wrap films or materials for food containers.

2. Description of the Prior Art

There have heretofore been proposed and used various types of laminate products which are made by laminating such materials as polyolefins, polyamides, polyesters, saponified ethylene-vinyl acetate copolymers or metals with different kinds of materials so that one material compensates for the defect of another. For instance, laminates of polyolefins with polyamides or polyesters are known as food wrap materials. Because of their good transparency, flexibility, hygienic properties and heat sealability, polyolefins have been widely used as wrapping or packaging materials for foods. However, polyolefins have a shortcoming in that owing to their high permeability to gases such as oxygen, carbon dioxide and the like, they are unable to preserve foods over a long term. On the other hand, although polyamides have good resistance to heat and an oil, they are poor in vapor permeability and heat sealability. Polyesters or saponified ethylene-vinyl acetate copolymers have low gas permeability and good heat resistance, but they are disadvantageously poor in heat sealability. These disadvantages can be overcome by lamination of polyolefins and these other materials.

However, lamination of these materials involves the drawback that adhesion between these materials is poor, causing delamination or ply separation to readily occur.

There have been conventionally proposed, as adhesive resins capable of improving the interlaminar bond strength, ethylene-vinyl acetate copolymers, ionomer resins or polyolefin resins modified with maleic anhydride or the like (see, for example, Japanese Laid-open Patent Application Nos. 51-92880, 52-32080, 54-82, 54-87753 and 54-160481). However, these resins have good compatibility with polyolefins or polyamides and a fairly high interlaminar bond strength, but are not yet satisfactory. In addition, the strength of adhesion to polyesters is not so high as to stand practical use.

SUMMARY OF THE INVENTION

It is accordingly an object of the present invention to provide adhesive resins which overcome the drawbacks of the prior art resins.

It is another object of the invention to provide adhesive resins which have improved interlaminar bond strength with respect to polyolefin and polyamide resins and have much improved adhesion to certain types of low-adhesive resins like polyesters and saponified ethylene-vinyl acetate copolymers.

It is a further object of the invention to provide various types of laminates using the adhesive resins of the type mentioned above whereby high interlaminar bond strength is ensured.

According to one embodiment of the invention, there is provided an adhesive resin which is obtained by reacting 100 parts by weight of an epoxy group-containing olefin polymer with 0.01–10 parts by weight of an ethylenically unsaturated fatty acid or derivative thereof.

According to another embodiment of the invention, there is also provided a laminated article which comprises at least two layers. One layer consists of an adhesive resin which is obtained by reacting 100 parts by weight of an epoxy group-containing olefin polymer with 0.01–10 parts by weight of at least one ethylenically unsaturated fatty acid or derivative thereof, or an olefin polymer composition comprising the adhesive resin. The other layer may be of a material selected from thermoplastic resins, thermosetting resins, rubbers, metals, cloth, paper, wood or glass.

DETAILED DESCRIPTION AND EMBODIMENTS OF THE INVENTION

The epoxy group-containing olefin polymers used in the present invention may be copolymers of olefins and unsaturated glycidyl group-containing monomers, and terpolymers or multi-polymers of olefins, unsaturated glycidyl group-containing monomers and ethylenically unsaturated monomers. The olefins in the copolymers should preferably be ethylene. Preferable copolymers consist of 50–99.96 wt% of ethylene, 0.05–50 wt% of a glycidyl group-containing monomer, and 0–49.95 wt% of an ethylenically unsaturated monomer.

Examples of the unsaturated glycidyl group-containing monomers include glycidyl esters such as glycidyl acrylate, glycidyl methacrylate, monoglycidyl itaconate, monoglycidyl butenetricarboxylate, diglycidyl butenetricarboxylate, triglycidyl butenetricarboxylate, glycidyl esters of alpha-chloroallyl, maleic acid, crotonic acid, fumaric acid and the like, glycidyl ethers such as vinyl glycidyl ether, allyl glycidyl ether, 2-methylallyl glycidyl ether, glycidyloxyethyl vinyl ether, styrene-p-glycidyl ether and the like, and p-glycidylstyrene. Preferably, glycidyl methacrylate and acryl glycidyl ether are mentioned.

The ethylenically unsaturated monomers of the invention may be at least one monomer selected from olefins, vinyl esters, alpha, beta-ethylenically unsaturated carboxylic acids and derivatives thereof. Specific examples include olefins such as propylene, butene-1, hexene-1, decene-1, octene-1, styrene and the like, vinyl esters such as vinyl acetate, vinyl propionate, vinyl benzoate and the like, acrylic acid, methacrylic acid and esters thereof such as methyl, ethyl, propyl butyl, 2-ethylhexyl, cyclohexyl, dodecyl, octadecyl acrylates or methacrylates, maleic acid, maleic anhydride, itaconic acid, fumaric acid, maleic mono and diesters, vinyl chloride, vinyl ethers such as vinyl methyl ether, vinyl ethyl ether and the like, and acrylic amides. Of these, acrylates are preferred.

The epoxy group-containing olefin polymers are prepared according to a high pressure radical polymerization process in which 50–99.95 wt% of ethylene, 0.05–50 wt% of at least one unsaturated glycidyl group-containing monomer, and 0–49.95 wt% of at least one other ethylenically unsaturated monomer are contacted simultaneously or in a stepwise manner for polymerization in a vessel or tubular reactor in the presence of 0.0001-1 wt% of a free radical catalyst, based on the total weight of the monomers, and also in the presence of a chain transfer agent and, if necessary, an aid under conditions of a polymerization pressure of 500-4000 Kg/cm$^2$, preferably 1000-3500 Kg/cm$^2$ and a reaction temperature of 50°-400° C., preferably 100°-350° C.

The free radical catalysts may be ordinary initiators such as peroxides, hydroperoxides, azo compounds, amine oxide compounds, oxygen and the like.

The chain transfer agents include, for example, hydrogen, propylene, butene-1, saturated aliphatic hydrocarbons and halogenated hydrocarbons having 1-20 carbon atoms or a greater number of carbon atoms, e.g. methane, ethane, propane, butane, isobutane, n-hexane, n-heptane, cycloparaffins, chloroform, carbon tetrachloride, saturated aliphatic alcohols having 1-20 or greater carbon atoms, e.g. methanol, ethanol, propanol, isopropanol and the like, saturated aliphatic carbonyl compounds having 1-20 or greater carbon atoms, e.g. carbon dioxide, acetone, methyl ethyl ketone and the like, and aromatic compounds such as toluene, diethylbenzene, xylene and the like.

The epoxy group-containing olefin polymers used in the present invention may be olefin homopolymers or copolymers modified by graft reaction thereto of the unsaturated glycidyl group-containing monomers.

The olefin polymers for these purposes are, for example, homopolymers such as low, medium and high density polyethylene, polypropylene, polybutene-1, poly-4-methylpentene-1 and the like, copolymers of a major proportion of ethylene and other alpha-olefins such as ethylenepropylene copolymers, ethylene-butene-1 copolymers, ethylene-hexene-1 copolymers, ethylene-4-methylpentene-1 copolymers, ethylene-octene-1 copolymers and the like, copolymers of a major proportion of propylene and other alpha-olefins such as propylene-ethylene block copolymers, ethylene-vinyl acetate copolymers, ethylene-acrylic acid copolymers, ethylene-methacrylic acid copolymers, copolymers of ethylene and methyl, ethyl, propyl, isopropyl and butyl esters of acrylic acid or methacrylic acid, ethylene-maleic acid copolymers, ethylene-propylene copolymer rubbers, ethylene-propylene-diene copolymer rubbers, liquid polybutadiene, ethylene-vinyl acetate-vinyl chloride copolymers, and mixtures thereof. These polymers may be further mixed with other types of synthetic resins or rubbers.

The ethylenically unsaturated fatty acids and derivatives thereof are, for example, acrylic acid, methacrylic acid, maleic acid, fumaric acid, itaconic acid, citraconic acid, maleic ahydride, citraconic anhydride, itaconic anhydride, methyl acrylate, methyl methacrylate, ethyl acrylate, ethyl methacrylate, butyl acrylate, butyl methacrylate, monoethyl or diethyl maleate, acrylic amide, methacrylic amide, maleic monoamide, sodium acrylate, sodium methacrylate, potassium acrylate, potassium methacrylate, and the like. Of these, maleic anhydride is most preferable.

In the practice of the invention, an ethylenically unsaturated fatty acid or derivative thereof is subjected to graft reaction with the epoxy group-containing olefin polymer in the presence of a radical generator.

The graft reaction may be carried out by several methods including a method using radical initiators, a method utilizing plasma, and a method in which temperatures are raised to produce thermal radicals. Of these, the method using radical initiators is preferred because of the inexpensive apparatus, convenience and high reactivity.

The radical initiators may be organic peroxides and azo nitriles. Examples of the organic peroxides include ketone peroxides such as methyl ethyl ketone peroxide, cyclohexane peroxide and the like, peroxy ketals such as 1,1-bis(t-butylperoxy)-3,3,5-trimethylcyclohexane, 1,1-bis(t-butylperoxy)cyclohexane and the like, hydroperoxides such as t-butyl hydroperoxide, cumene hydroperoxide, diisopropylbenzene hydroperoxide and the like, dialkyl peroxides such as di-t-butyl peroxide, t-butyldicumyl peroxide, dicumyl peroxide, $\alpha,\alpha'$-bis(t-butylperoxyisopropyl)benzene, 2,5-dimethyl-2,5-di(t-butylperoxy)hexane, 2,5-dimethyl-2,5-di(t-butylperoxy)hexine-3 and the like, diacyl peroxides such as benzoyl peroxide, octanoyl peroxide, decanoyl peroxide and the like, peroxydicarbonates such as diisopropyl peroxydicarbonate, di-n-propyl peroxydicarbonate and the like, and peroxy esters such as t-butyl peroxyacetate, t-butyl peroxyisobutylate, t-butyl peroxybenzoate and the like. Examples of azonitriles include azobisisobutyronitrile, azobisisopropionitrile and the like. These compounds are properly selected depending on the reaction conditions such as reaction solvent, reaction temperature and the like.

The reaction using the radical initiators may be carried out by a number of methods. For instance, there are mentioned a method in which the reaction is effected in the state of a solution using a medium which is a good solvent for epoxy group-containing olefin polymers (solution reaction), a method in which the reaction is effected in the state of a suspension using a medium which is a poor solvent for epoxy group-containing olefin polymers (suspension reaction), and a method in which the reaction is effected without use of any medium while heating and mixing epoxy group-containing olefin polymers at temperatures higher than the melting or softening point thereof (melt reaction). The mediums used for the solution reaction include aliphatic hydrocarbons such as hexane, heptane, octane, cyclohexane, decaline and the like, aromatic hydrocarbons such as benzene, toluene, xylene, tetralin and the like, and polar solvents such as dichlorobenzene, chloroform, carbon disulfide, carbon tetrachloride, trichloroethane and the like. The mediums suitable for the suspension reaction are, for example, water. For the melt reaction, it is usual to use extruders, kneaders, Banbury mixers and rolls ordinarily used for processing of plastics or rubbers. The reaction conditions should be appropriately selected. The reaction should be effected at temperatures which permit the olefin polymer to melt and the radical initiator to sufficiently decompose within the reaction time. If the temperature is too high, epoxy group-containing olefin polymers or ethylenically unsaturated fatty acids may decompose, causing side reaction to occur. Accordingly, the temperature is preferably in the range of approximately 100°-300° C.

The amount of addition of the ethylenically unsaturated fatty acid is selected from a range of 0.01-10 parts by weight, preferably 0.1-5 parts by weight, per 100 parts by weight of the epoxy group-containing olefin polymer. If the amount is less than 0.01 part by weight, the adhesion strength is not improved and thus the desired effect cannot be attained. On the other hand, when the amount exceeds 10 parts by weight, the resulting resin is colored or gelation proceeds, thus causing foreign matters to be unfavorably produced.

The adhesive resin obtained in the present invention may be used as adhesive resin compositions by mixing with polyolefins in desired mixing ratio.

In the practice of the invention, both the unsaturated glycidyl group-containing monomer and the ethylenically unsaturated fatty acid may be added to the olefin polymer at the same time.

According to the second embodiment of the invention, the adhesive resin or an olefin polymer composition comprising the adhesive resin is used for lamination with other materials to obtain laminate articles having at least two layers.

Other materials used in the present invention are thermoplastic resins, thermosetting resins, rubbers, metals, cloths, paper, wood and glass.

More particularly, such materials include: olefin polymers including homopolymers such as low, medium and high density polyethylene, polypropylene, polybutene-1, poly-4-methyl-pentene-1 and the like, copolymers of a major proportion of ethylene and other alpha-olefins such as, for example, ethylene-propylene copolymers, ethylenebutene-1 copolymers, ethylene-hexene-1 copolymers, ethylene-4-methylpentene-1 copolymers and the like, copolymers of a major proportion of propylene and other alpha-olefins such as propylene-ethylene block copolymers, ethylene-vinyl acetate copolymers, ethylene-acrylic acid copolymers, ethylene-methacrylic acid copolymers, copolymers of ethylene and methyl, ethyl, propyl, isopropyl, butyl esters of acrylic or methacrylic acid, ethylene-maleic acid copolymers, ethylene-vinyl acetate-vinyl chloride copolymes, and mixtures thereof; other thermoplastic resins including saponified ethylene-vinyl acetate copolymers, polyamide resins, polycarbonate resins, polyvinyl chloride resins, polyvinylidene chloride resins, polyester resins, polyacrylonitrile resins, polystyrene resins, polyvinyl alcohol resins, ABS resins, polymethacrylates, fluorocarbon resins, polyimide resins, polyamideimide resins, polyether/ether ketone resins, polyetheresulfone resins, polysulfone resins, polyphenylene oxide resins, polyphenylene sulfide resins, polyacetyl resins and mixtures thereof; thermosetting resins such as phenolic resins, urea resins, melamine resins and the like; and rubbers.

Examples of rubbers include synthetic rubbers such as polybutadiene, polyisoprene, neoprene rubber, ethylene-propylene copolymers, ethylene-propylene-diene copolymers, styrene-butadiene copolymers, styrene-acrylonitrile-butadiene copolymer, butyl rubber, polyurethane rubber, chlorosulfonated polyethylene, chlorinated polyethylene, fluororubbers, thiokol and the like, and natural rubbers.

Sheets of the synthetic resins or rubbers mixed with fillers may be also used in the present invention.

The fillers for these purposes include, for example, powdery and particulate fillers such as calcium carbonate, magnesium carbonate, calcium sulfate, calcium silicate, clay, diatomaceous earth, talc, alumina, quartz sand, glass powder, iron oxide, metal powders, antimony trioxide, graphite, silicon carbide, silicon nitride, silica, boron nitride, aluminum nitride, wood powder, carbon black and the like; plate-like or flaky fillers such as mica, glass, sericite, pyrophyllite, metal foils such as aluminum flake, graphite and the like; hollow fillers such as Shirasu balloons, metal balloons, glass balloons, pumice stone and the like; fibrous fillers such as glass fibers, carbon fibers, graphite fibers, whiskers, metal fibers, silicon carbide fibers, mineral fibers, e.g. asbestos and wollastonite, and organic fibers such as viscose, polyamide and vinylon fibers; and textile fillers such as glass fiber mats, organic fiber mats and the like.

Other substrate materials include metal foils, metal sheets, metal gauzes and punched plates of metals such as chromium, iron, nickel, zinc, tin, aluminum, copper, brass, galvanized steel and the like.

Cloths that can be employed as substrates include non-woven or woven fabrics or nettings of fibers such as tape yarns and monofilaments obtained from the thermoplastic resins indicated before, split films obtained by finely cutting films of the thermoplastic resins, woven fabrics of synthetic fibers such as vinylon and tetron fibers or natural fibers such as cotton, silk and hemp fibers, and woven fabrics, mats and felts of fibers such as glass fibers, carbon fibers and metal fibers.

Paper sheets used as a substrate material may not be critical and include, for example, packaging papers such as kraft paper, roll paper and the like, thin papers such as glassine paper, paperboards and other machine-made papers, Japanese papers such as shoji paper, and synthetic papers such as polystyrene paper, vinylon paper and the like.

Examples of the multi-layer laminates using different types of materials include polyester resin layer (hereinafter abbreviated as PET)/adhesive resin layer (hereinafter abbreviated as MEGA)/high density polyethylene layer (hereinafter abbreviated as HDPE), PET/MEGA/saponified ethylene-vinyl acetate copolymer (hereinafter abbreviated as saponified EVA), PET/MEGA/aluminum, PET/MEGA/paper, PET/MEGA/PET, PET/MEGA/PET/ethylene-butene-1 copolymer (hereinafter abbreviated as LLDPE), and the like.

The method of making the laminated product is not critical and includes, for example, blown film extrusion using multi-layer dies, flat film extrusion using T-dies, blow molding, injection molding, brush application, fluidized bed coating, powder spray coating, electrostatic coating, press molding and the like.

In the practice of the invention, various forms of materials including films, sheets, plates, bars, pipes, woven fabrics, and other processed articles may be bonded.

Moreover, various additives may be used in the range of amount not impeding the purpose of the invention. Examples of such additives include antioxidants, UV absorbers, flame retardants, copper deactivators, processability improvers, reinforcing agents, fillers, colorants, pigments, antistatic agents, antiblock agents, foaming agents and the like.

The present invention is more particularly described by way of examples and comparative examples.

EXAMPLES 1-2

Preparation of Adhesive Resins 1.7 kg of ethylene and 30 g of glycidyl methacrylate comonomer were charged into a 3.8 liter autoclave, followed by copolymerizing in the presence of di-tertiary-butyl peroxide under conditions of a pressure of 1700 kg/cm$^2$·g and a temperature of 170° C., thereby obtaining 100 parts by weight of ethylene-glycidyl methacrylate copolymer (hereinafter referred to simply as Et-GMA). This Et-GMA copolymer was subjected to graft reaction with 0.25 part by weight of maleic anhydride in a plastograph in the presence of 0.015 part by weight of dicumyl peroxide at a temperature of 190° C. for a reaction time of 7 minutes. The resulting product (referred to simply as Et-GMA/MAn) was washed with acetone and made into a thin film, followed by quantitative determination of the amount of combined maleic anhydride by infrared spectroscopic analysis. The results are shown in Table 1 given hereinafter.

The above procedure was repeated using a different amount of the comonomer, thereby obtaining another adhesive resin. The results are also shown in Table 1.

These adhesive resins were used for adhesion to PET and other substrate materials and the resulting laminates were subjected to measurement of interlaminar bond strength with the results shown in Table 1. The interlaminar bond strength was measured under the following conditions.

g/10 minutes. The blend was used for the adhesion test in the same manner as in Example 1. The results are also shown in Table 1.

Comparative Examples 1-3

Ethylene-ethyl acrylate copolymer having an ethyl acrylate content of 19 wt% and a melt index of 5.3 g/10 minutes, ethylene-vinyl acetate copolymer having a vinyl acetate content of 15 wt% and a melt index of 1.5 g/10 minutes (hereinafter referred simply as EVA), and maleic anhydride-modified low density polyethylene having a density of 0.92 g/ml and a melt index of 1.0 g/10 minutes (trademark; N Polymer L6100, made by Nippon Petrochemical Co., Ltd.) (hereinafter referred to as N Polymer) were used, as adhesive resins, for adhesion to several substrate materials in the same manner as in Example 1. The results are shown in Table 1.

TABLE 1

| Example/ Comp. Ex. | Adhesive Resin | Amount of Comonomer Combined (wt %) | MI (g/10 min.) | Bond Strength (kg/25 mm in width) | | | |
|---|---|---|---|---|---|---|---|
| | | | | PET | Saponified EVA | HDPE | Al |
| Example 1 | Et-GMA/MAn | GMA = 5.0  MAn = 0.14 | 0.5 | breakage of material | 13.0 | breakage of material | breakage of material |
| Example 2 | Et-GMA/MAn | GMA = 14.0  MAn = 0.14 | 0.4 | breakage of material | 13.5 | breakage of material | breakage of material |
| Example 3 | Et-GMA-EA/MAn | GMA = 5.1  EA = 15  MAn = 0.14 | 0.3 | breakage of material | 13.2 | breakage of material | breakage of material |
| Example 4 | Et-GMA/MAn + EEA blend | GMA = 4.7  MAn = 0.05 | 2.4 | breakage of material | 13.1 | breakage of material | breakage of material |
| Comp. Ex. 1 | EEA | EA = 19 | 5.3 | 0.7 | 0.8 | breakage of material | 9.7 |
| Comp. Ex. 2 | EVA | VA = 15 | 1.5 | 0.7 | 0.8 | breakage of material | 12.7 |
| Comp. Ex. 3 | N Polymer | — | 1.0 | 1.5 | 5.0 | breakage of material | 8.5 |

Measuring Conditions

PET, saponified EVA, HDPE and Al sheets, each having a thickness of 2 mm, were each placed over an adhesive resin sheet having a thickness of 1 mm, which was backed by a 50 μm thick Al foil for its reinforcement. The sheet assemblies were preheated for 5 minutes, and then pressed under conditions of 240° C. and 50 kg/cm$^2$×5 minutes for PET and under conditions of 180° C. and 50 kg/cm$^2$×5 minutes for the other materials. Each laminate was subsequently cooled and cut to a width of 25 mm to give a test piece.

The test pieces were subjected to 180° peeling test at a pulling rate of 50 mm/minute, and the values determined were given as the interlaminar bond strength.

EXAMPLE 3

The general procedure of Example 1 was repeated using, as the comonomers, glycidyl methacrylate and ethyl acrylate to obtain a terpolymer of ethylene-glycidyl methacrylate-ethyl acrylate (hereinafter referred to as Et-GMA-EA), followed by graft reaction in the same manner as in Example 1 to obtain a maleic anhydride grafted polymer (hereinafter referred to simply as Et-GMA-EA/MAn). Thereafter, an adhesion test was conducted in the same manner as in Examples. The results are shown in Table 1.

EXAMPLE 4

One hundred parts by weight of the adhesive resin obtained in Example 2 was blended with 200 parts by weight of ethylene-ethyl acrylate copolymer having an ethyl acrylate content of 19 wt% and a melt index of 5.3

The adhesive resins of the invention have good adhesion force and wide utility in the field of coating on and lamination with other materials. They are applicable as a solution in solvent, or by a powder coating method.

Thermoplastic resins including olefin polymers such as polyethylene, polypropylene, ethylene-alpha-olefin copolymers, ethylene-vinyl acetate copolymers and the like may be added to the adhesive resins for dilution.

Laminated sheets, films, or other articles consisting of at least two layers, one of which is made of the adhesive resin, have a high interlaminar bond strength, and can also be readily heat-sealed with other types of materials. Three-layer or multi-layer laminates such as of PET-/adhesive resin/polyolefin or saponified EVA make use of the characteristics of polyester, e.g. low gas permeability and high resistance to oil and heat, along with good characteristics of the other materials. These laminates will be utilized as food wrap films, food packaging bottles for mayonnaise, soy sauce, beer, carbonated drinks, oil and the like, films or bottles for wrapping medicines, and gasoline tanks.

What is claimed is:

1. An adhesive resin obtained by chemically combining, in the presence of a radical initiator 0.01–10 parts by weight of at least one ethylenically unsaturated fatty acid or anhydride thereof with 100 parts by weight of an epoxy group-containing olefin polymer prepared by subjecting 50–99 wt. % of ethylene, 0.05–50 wt. % of at least one unsaturated glycidyl group-containing monomer and up to 49.95 wt. % of at least one other ethylenically unsaturated monomer, to high pressure polymerization.

2. An adhesive resin according to claim 1, wherein the unsaturated glycidyl group-containing monomer is glycidyl acrylate or glycidyl methacrylate.

3. An adhesive resin according to claim 1 wherein the ethylenically unsaturated monomer is at least one member selected from the group consisting of olefins, vinyl esters, ethylenically unsaturated fatty acids and derivatives of the fatty acids.

4. An adhesive resin according to claim 1, wherein said epoxy group-containing olefin polymer is an olefin homopolymer or copolymer which is at least one member selected from the group consisting of low, medium and high density polyethylenes, polypropylene, polybutene-1, poly-4-methylpentene-1, ethylene-propylene copolymer, ethylene-butene-1 copolymer, ethylene-hexene-1 copolymer, ethylene-4-methylpentene-1 copolymer, ethylene-octene-1 copolymer, ethylene-vinyl acetate copolymer, ethylene-acrylic acid copolymer, ethylene-methacrylic acid copolymer, ethylene-methyl acrylate copolymer, ethylene-methyl methacrylate copolymer, ethylene-ethyl acrylate copolymer, ethylene-ethyl methacrylate copolymer, mixtures thereof, and products of the above resins modified with unsaturated carboxylic acids or derivatives thereof, and modified by graft reaction thereonto of a glycidyl acrylate or glycidyl methacrylate.

* * * * *